Patented June 16, 1936

2,044,167

UNITED STATES PATENT OFFICE 2,044,167

PROCESS OF PRODUCING AMMONIUM SULPHATE

Hugo Heimann, Haifa, Palestine, assignor to the firm of Bayerische-Stickstoff-Werke, Aktiengesellschaft, Berlin, Germany No Drawing. Application April 13, 1934, Serial No. 720,438. In Germany November 11, 1931

13 Claims. (Cl. 23—119)

The present invention relates to a process of producing ammonium sulphate from ammonia and sulphur.

The hitherto used process of producing ammonium sulphate from ammonia and sulphur requires four stages of treatment, namely oxidation of the sulphur to sulphur dioxide, oxidation of the dioxide to trioxide after the chamber method or the contact method, conversion of the trioxide into sulphuric acid and, finally, neutralization with ammonia.

It is known that when ammonia water is heated with sulphur it will take up a light yellow color whereby simultaneously a partial formation of ammonium hyposulphite takes place, and that when the heating takes place under pressure dark brown-yellow liquids are formed which contain ammonium polysulphides. It is also known, that ammonium sulphide may be converted into ammonium sulphate by oxidizing under pressure with gases containing oxygen. However, it has until now not been possible to utilize these scientific observations on a commercial scale.

I have now found, that it is possible to convert sulphur into ammonium sulphate by subjecting the sulphur to an oxidation under pressure in the presence of water (in liquid state or in the form of water vapor or steam) and ammonia or compounds containing ammonia or forming ammonia under the conditions prevailing during the treatment. By proceeding in this manner the sulphur will be completely converted into ammonium sulphate.

Instead of or together with elementary sulphur natural or artificial sulphides of ore-forming heavy or light metals may be used, such as for instance pyrite, aluminium sulphide or the like. In all cases the reaction is allowed to proceed until the sulphate is formed. If at least so much ammonia is used, as would correspond to the stoichiometrically indicated proportion, the sulphur will appear almost quantitatively in the form of ammonium sulphate. In this case, the metal sulphides are converted into oxides. If the treatment is performed with lesser amounts of ammonia, then besides the ammonium sulphate also sulphates of the metals will be produced. Under certain circumstances it may be advantageous to add carbon dioxide in free or bound state, for instance in the form of ammonium carbonate, ammonium bicarbonate, alkali carbonate or alkali bicarbonate. The addition of carbon dioxide may for instance be of advantage when sulphidic ores which contain calcium silicate are used and the oxidation is carried out without an excess of ammonia. In this case part of the sulphur would be obtained in the form of the valueless calcium sulphate. If carbon dioxide is added however the calcium will during the reactions be converted into calcium carbonate. The addition of carbon dioxide is also recommendable if in view of the further treatment it is desired to obtain metal carbonates instead of metal oxides.

The pressure oxidation is suitably performed by means of the oxygen of the air or by means of gases which give off active oxygen, such as ozone or nitrogen dioxide or by means of compounds, such as for instance per-salts or nitrates. The temperature at which the reaction is carried out may vary within wide limits, but should preferably not be lower than about 100° C. The pressures may also vary within wide limits. The partial pressure of the oxygen may for instance amount to 5–10 atmospheres, but also lower pressures may be employed. The higher the pressure and the temperature the faster the process will be carried to an end. The process is highly exothermic and therefore, when the apparatus in which the reaction takes place is properly insulated, it is not necessary to supply heat from the outside after the reaction has been initiated. The gases added may be utilized until the entire content of oxygen has been spent. To the sulphur also other suitable substances may be added, such as for instance sulphides, sulphites, rhodanides or other oxidizable sulphur compounds or masses containing such compounds. Masses of this kind, such as for instance gas purifier mass, are also converted by the treatment into sulphates. Such masses may without previous treatment be introduced into the process. It is also possible instead of natural sulphides to use sulphides which have been more or less roasted.

If copper-containing sulphidic ores are employed the amount of ammonia used should be kept as low as possible, in order to prevent the copper from passing into solution in the form of a copper ammonium complex and contaminating the solutions of ammonium sulphate.

The further treatment of the products obtained by my improved process takes place in known manner and varies in accordance with the nature of the ores, and the particular local and economical conditions. If the process is combined with an electrolytical process, for instance with the electrolytical production of zinc, the oxygen obtained at the anodes may advantageously be utilized in the pressure oxidation.

When the treatment is performed continuously the sulphur may for instance be pressed into the reaction vessel through a filter plate or by means of a pump, against the pressure existing in the interior of the vessel. The sulphur may for instance be used in molten state or in the form of a paste consisting of the sulphidic starting material and water or ammonia-containing water. If additional quantities of water or ammonia are needed during the treatment the same may be introduced through a second inlet valve. The converted solution may be drawn off through a valve at the bottom of the reaction vessel, together with or without the metal compounds which have separated out. The apparatus may be protected by lining it with a material which is not attached by the ammonium sulphate lyes.

In order to secure a uniform distribution in finely divided state of the sulphur used in the process the sulphur may be introduced into the reaction chamber through a distributing device, for instance through a rotating screen or the like.

The oxidation may also be performed in the presence of catalysts or of substances which exert a loosening effect or prevent the sulphur particles from baking together. Iron oxide and similar substances are for instance particularly well suited for this purpose. Spent gas purifier mass contains iron oxide and when masses of this kind are used in the described process the same are regenerated in a single working procedure and simultaneously the sulphur is converted into ammonium sulphate. The cyan and rhodan compounds which are present in the gas purifier mass will also appear in the form of ammonium sulphate. The oxidizing reaction is also in no way influenced by the sulphurous acid, the carbon dioxide or the hydrocyanic acid which are present in the gas purifier mass. When such mass is used together with an amount of ammonia which at least is equivalent to the sulphur content of the mass, in all cases only two products are obtained, namely regenerated mass and ammonium sulphate in solution. Since the mass may be used in a circulation process for the purifying of gas it is not necessary to remove all the solution of ammonium sulphate from the regenerated mass and therefore the formation of dilute rinsing water may be avoided. As for the rest the degree of concentration of the ammonium sulphate solution obtained will of course correspond to the original ammonia content of the solution or, in case of an excess of ammonia being present, to the sulphur content of the mass. If the present method is employed in coke plants and similar works and these gas waters are used, for instance waters containing 2-3% of ammonia, it is nevertheless possible to obtain concentrated solutions of ammonium sulphate. This result may for instance be attained by using the sulphatized solution instead of fresh water for the treatment of the coal distillation gases in the ammonia washing stage and exchanging this measure repeatedly with oxidation processes of the gas mass, under use of the obtained ammonia water, until an ammonium sulphate solution of the desired concentration is obtained. The organic contaminations of the gas mass are for the greater part destroyed already during the pressure oxidation. If in spite of this the ammonium sulphate solution still should be impure the same may be bleached or subjected to another suitable purifying treatment.

*Example 1*

290 g. of spent gas purifier mass containing 117,5 g. of S and 5,5 g. of N were mixed with 1 litre of ammonia water containing 89.8° g. of N and the mixture was heated to 180-205° C. in a shakeable suitably lined autoclave having a volume of 2 litres and the pressure was raised to 40 atmospheres by means of compressed oxygen. The rapid drop of the pressure when the supply of oxygen is interrupted is a measure for the speed of reaction. The reaction was completed in the course of 3 hours after which time the pressure remained constant when the supply of oxygen was stopped. The excess of ammonia was driven away by relieving the pressure and blowing some steam through the autoclave. The content of the autoclave was separated by filtration into 1265 cm$^3$ of a clear solution (including the washing water) and a brownish-red residue. The solution contained in the form of sulphate 108,8 g. of sulphur=92,5% of the amount introduced and in the form of ammonium sulphate 89,8 g. of nitrogen=94,3% of the introduced amount. From the residue 145 g. of a dry substance was obtained, which contained 7,9 g. of sulphur=6,8% of the introduced quantity and 2,6 g. of nitrogen=2,7% of the introduced quantity. Thus, 97% of the nitrogen content of the starting material was recovered. The residue which had the look of fresh mass was just as well suited for use in gas purifiers as fresh mass.

The working up of the gas purifying mass may be combined with the oxidation of sulphur by enrichening the mass with additional sulphur.

*Example 2*

The device used for performing the treatment was a shakeable autoclave of chromium nickel steel having a content of 2 litres. The autoclave was heated externally by means of gas. 100 g. of ground sulphur crumbs containing 95,5% of pure sulphur were filled into the autoclave, whereupon 1 litre of 12% ammonia water was added.

The charge was heated to a temperature of 180° C. for one hour, whereupon oxygen was let in from a steel flask until a pressure of 35 atmospheres was measured. The drop of pressure indicated that an active absorption commenced at once. The absorbed oxygen was continuously compensated for by supplying fresh oxygen. The absorbed oxygen was measured and it was found, that 80% of the theoretically absorbable amount was absorbed already within one hour. After the lapse of one hour and 40 minutes the constancy of the pressure indicated that the absorption of oxygen was finished. After the autoclave had been cooled the same was opened and it was found that the sulphur had disappeared completely. The ammonium sulphate solution was free from sulphite and thiosulphate. By evaporation of the solution 350 g. of a pure white ammonium sulphate was obtained.

This example shows, that the reaction is not dependent on the presence of the catalytically acting iron oxide. Nor is it likely that the walls of the autoclave exerted any catalytic effect, since the smoothness and brightness of the same were unaltered after the experiment had been carried to an end and it will be known to all skilled in the art, that when a reaction is accelerated by the intermediary of a metallic contact a change in the nature of the surface of the metal will always be observed. The reaction will therefore also take place when no loosening or catalytically acting additions are used.

Example 3

Pyrite of Spanish origin containing 48,6% of sulphur, 42,3% of iron and 2,4% of copper was ground so finely, that less than 2% remained on a sieve having 4900 meshes per cm$^2$. 200 g. of this pyrite and 1 litre of ammonia water containing 110 g. of ammonia were heated together to 180–200° C. in a shakeable autoclave which had a content of 2 litres and was equipped with a suitable protective lining and the pressure was raised to 20 atmospheres. Oxygen was introduced until a total pressure of 40 atmospheres was attained. When the autoclave was shaken the drop of pressure indicated, that a vigorous absorption was taking place. The pressure of 40 atmospheres was maintained by continuously leading oxygen into the autoclave. The absorption was completed in the course of two hours. By filtration the charge was separated into a deep blue filtrate and a red-brown residue. After the surplus of ammonia had been driven off the copper was removed from the solution by adding iron to the latter and the iron was precipitated out by means of a suitable amount of ammonia. After the filtrate had been freed from the metals it was evaporated whereby 355 g. of ammonium sulphate was obtained. This result shows that 86% of the sulphur was converted. The precipitated copper had a weight of 4,2 g., i. e. 87,5% of the copper content of the pyrite was recovered. The residue of iron oxide had a weight of 132 g.

Example 4

200 g. of zinc sulphide precipitated out from an ammonia-alkaline solution of zinc sulphate by means of sulphuretted hydrogen were mixed with 1 litre of ammonia water containing 80 g. of ammonia and in a shakeable autoclave having a content of 2 litres the mixture was kept at a temperature of 180° C. and treated with oxygen at a total pressure of 30 atmospheres. After half an hour the absorption of oxygen ceased. After the autoclave had been cooled and the pressure in the same reduced it was opened. The zinc sulphide had disappeared completely and the autoclave contained a clear fluid. By analysis it was found, that the fluid contained besides ammonium sulphate and a surplus of ammonia dissolved zinc oxide and zinc ammonium hydrate. The solution could without further treatment be used again for the absorption of sulphuretted hydrogen.

I want it to be understood, that the term H$_2$O as used in the claims is meant to cover water in liquid form, in the form of vapor and in the form of steam, and that the term oxygen as used in the claims is meant to cover pure oxygen and gases which contain oxygen or which will give off oxygen at the temperature of reaction. Also, the term ammonia as used in the claims is meant to cover ammonia in liquid and gaseous state and in aqueous solution.

It is obvious, that various changes and modifications may be made in practicing the invention, over the specific procedures above described, without departing from the true spirit of the invention.

I claim:

1. A process capable of producing ammonium sulphate of commercial purity, which comprises subjecting sulphur and aqueous ammonia simultaneously to the action of oxygen under pressure and at temperatures of the order of 100° C. and above until the sulphur is combined in the form of ammonium sulphate.

2. A process capable of producing ammonium sulphate of commercial purity, which comprises subjecting sulphur and aqueous ammonia simultaneously to the action of oxygen under pressure in the presence of carbon dioxide and at temperatures of the order of 100° C. and above until the sulphur is combined in the form of ammonium sulphate.

3. A process capable of producing ammonium sulphate of commercial purity, which comprises subjecting sulphur and an aqueous solution which will liberate ammonia simultaneously to the action of oxygen under pressure and at temperatures of the order of 100° C. and above until the sulphur is combined in the form of ammonium sulphate.

4. A process capable of producing ammonium sulphate of commercial purity, which comprises subjecting oxidizable sulphur compounds and aqueous ammonia simultaneously to the action of oxygen under pressure and at temperatures of the order of 100° C. and above until the sulphur is combined in the form of ammonium sulphate.

5. A process capable of producing ammonium sulphate of commercial purity, which comprises subjecting sulphide ores and aqueous ammonia simultaneously to the action of oxygen under pressure and at temperatures of the order of 100° C. and above until the sulphur of such ores is combined in the form of ammonium sulphate.

6. A process capable of producing ammonium sulphate of commercial purity, which comprises subjecting spent gas purifier mass and aqueous ammonia simultaneously to the action of oxygen under pressure and at temperatures of the order of 100° C. and above until the sulphur contained in such mass is combined in the form of ammonium sulphate.

7. A process capable of producing ammonium sulphate of commercial purity, which comprises subjecting sulphur and aqueous ammonia under pressure simultaneously to the action of substances which liberate oxygen and at temperatures of the order of 100° C. and above until the sulphur is combined in the form of ammonium sulphate.

8. A process capable of producing ammonium sulphate of commercial purity, which comprises subjecting copper-containing sulphidic ores and aqueous ammonia simultaneously to the action of oxygen under pressure and at temperatures of the order of 100° C. and above until the sulphur contained in such mass is combined in the form of ammonium sulphate, and controlling the solution of the copper contained in the starting materials by regulating the quantity of ammonia added.

9. A process capable of producing ammonium sulphate of commercial purity, which comprises heating sulphidic ores under pressure and at temperatures of the order of 100° C. and above in the presence of aqueous ammonia and oxygen until the sulphur is combined in the form of ammonium sulphate, separating out the metals electrolytically from the treated ores and using the oxygen obtained in the electrolysis for treatment of the sulphidic ores.

10. A process capable of producing ammonium sulphate of commercial purity, which comprises subjecting sulphur and aqueous ammonia simultaneously to the action of oxygen under pressure of about 20 to 40 atm. and at a temperature of 150 to 205° C. until the sulphur is combined in the form of ammonia sulphate.

11. A process capable of producing ammonium sulphate, of commercial purity, which comprises subjecting oxidizable sulphur compounds and aqueous ammonia simultaneously to the action of oxygen under a pressure of about 20 to 40 atm. and at a temperature of about 150 to 205° C. until the sulphur is combined in the form of ammonium sulphate.

12. A process capable of producing ammonium sulphate of commercial purity, which comprises subjecting sulphur and aqueous ammonia in the presence of a catalyst simultaneously to the action of oxygen under a pressure of about 20 to 40 atm. and at a temperature of about 150 to 205° C. until the sulphur is in the form of ammonium sulphate.

13. A process capable of producing ammonium sulphate of commercial purity, which comprises subjecting oxidizable sulphur compounds and aqueous ammonia in the presence of a catalyst to the action of oxygen under a pressure of about 20 to 40 atm. and at a temperature of about 150 to 205° C. until the sulphur is in the form of ammonium sulphate.

HUGO HEIMANN.